United States Patent
Boudet et al.

(10) Patent No.: US 11,184,093 B2
(45) Date of Patent: Nov. 23, 2021

(54) METHOD FOR TESTING AT LEAST ONE TRANSMITTING ANTENNA OF A VEHICLE

(71) Applicants: Continental Automotive France, Toulouse (FR); Continental Automotive GmbH, Hannover (DE)

(72) Inventors: Cédric Boudet, Toulouse (FR); Xavier Bressan, Toulouse (FR); Vincent Jamart, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 17/265,884

(22) PCT Filed: Jul. 18, 2019

(86) PCT No.: PCT/EP2019/069401
§ 371 (c)(1),
(2) Date: Feb. 4, 2021

(87) PCT Pub. No.: WO2020/030399
PCT Pub. Date: Feb. 13, 2020

(65) Prior Publication Data
US 2021/0167876 A1    Jun. 3, 2021

(30) Foreign Application Priority Data
Aug. 8, 2018 (FR) ...................................... 1857374

(51) Int. Cl.
*H04B 17/318* (2015.01)
*H04B 17/12* (2015.01)
(Continued)

(52) U.S. Cl.
CPC ....... *H04B 17/318* (2015.01); *G07C 9/00309* (2013.01); *H04B 17/12* (2015.01);
(Continued)

(58) Field of Classification Search
CPC ..... H04W 24/10; H04W 24/08; H04W 24/00; H04W 24/02; H04W 24/04; H04W 24/06; H04W 88/00; H04W 88/02; H04W 88/08; H04W 88/12; H04W 40/04; H04W 40/06; H04W 40/08; H04W 40/12; H04B 17/318; H04B 17/12; H04B 17/00; H04B 17/0085;
(Continued)

(56) References Cited

U.S. PATENT DOCUMENTS 9,928,733 B2 * 3/2018 Majtan ................... G08C 25/00
10,569,741 B1 * 2/2020 Park et al. ............. B60R 25/245
(Continued)

FOREIGN PATENT DOCUMENTS

EP    2942760 A1    11/2015
GB    2550965 A    12/2017

OTHER PUBLICATIONS

English Translation of the Written Opinion for International Application No. PCT/EP2019/069401, dated Sep. 16, 2019, 6 pages.
(Continued)

*Primary Examiner* — Meless N Zewdu
(74) *Attorney, Agent, or Firm* — RatnerPrestia

(57) ABSTRACT

A method for testing at least one transmitting antenna of a vehicle, in particular a motor vehicle, using a test computer and an electronic key.

10 Claims, 2 Drawing Sheets

(51) Int. Cl.
*G07C 9/00* (2020.01)
*H04W 24/10* (2009.01)
*H04W 88/02* (2009.01)

(52) U.S. Cl.
CPC .......... *H04W 24/10* (2013.01); *H04W 88/02* (2013.01); *G07C 2209/63* (2013.01)

(58) Field of Classification Search
CPC ........ H04B 17/10; H04B 17/11; H04B 17/15; H04B 17/16; H04B 17/19; H04B 17/309; H04B 17/336; H04B 7/06; H04B 1/082; H04B 17/345; H04B 7/02; H04B 7/00; H04B 7/04; H04B 7/0404; H04B 7/0408; H04B 7/0452; H04B 7/0456; H04B 3/46; H04B 3/462; H04B 3/466; H04B 3/487; H04B 3/493; H04B 17/29; H04B 17/27; H04B 17/26; H04B 17/17; H04B 17/354; H04B 7/0617; H04B 7/0615; H04B 7/0469; H04B 7/0608; H04B 7/0682; H04B 7/0684; H04B 88/00; H04B 88/02; H04B 88/08; H04B 17/391; H04B 17/3911; H04B 17/3912; H04B 17/3913; G07C 9/00; G07C 9/00309; G07C 2009/00261; G07C 2209/06; G07C 2209/63; H04Q 3/267; H04L 1/24; H04L 1/244; H04L 1/243; H04L 1/248; H04L 1/005

See application file for complete search history.

(56) References Cited

U.S. PATENT DOCUMENTS

| | | | |
|---|---|---|---|
| 2009/0153317 A1* | 6/2009 | Kim | 340/447 |
| 2014/0379175 A1* | 12/2014 | Mittermeier | B60W 50/10 |
| 2017/0136992 A1 | 5/2017 | Hamada et al. | |
| 2017/0160786 A1* | 6/2017 | Ji | |
| 2017/0193717 A1* | 7/2017 | Kim | G07C 9/00007 |
| 2017/0287326 A1* | 10/2017 | Majtan | G08C 25/00 |
| 2017/0352185 A1 | 12/2017 | Flordal et al. | |
| 2019/0143942 A1* | 5/2019 | Neuhoff | B60R 25/245 |
| 2019/0152437 A1* | 5/2019 | Verkin et al. | B60R 25/24 |

OTHER PUBLICATIONS

International Search Report and Written Opinion for International Application No. PCT/EP2019/069401, dated Sep. 16, 2019, with partial English translation, 8 pages.
International Search Report and Written Opinion for International Application No. PCT/EP2019/069401, dated Sep. 16, 2019, 9 pages (French).

* cited by examiner

METHOD FOR TESTING AT LEAST ONE TRANSMITTING ANTENNA OF A VEHICLE

CROSS REFERENCE TO RELATED APPLICATIONS

This application is the U.S. National Phase application of PCT International Application No. PCT/EP2019/069401, filed Jul. 18, 2019, which claims priority to French Patent Application No. 1857374, filed Aug. 8, 2018, the contents of such applications being incorporated by reference herein.

FIELD OF THE INVENTION

The invention is concerned with vehicle, in particular motor vehicle, computer units and more particularly with the configuration tables used in such computer units. An aspect of the invention is in particular to simplify the existing structure of the configuration tables used today in vehicle computer units in order to save the limited resources of said computer units.

BACKGROUND OF THE INVENTION

Nowadays, a motor vehicle is equipped with a plurality of computer units making it possible to manage the equipment of the vehicle such as the unlocking of the doors, the dashboard, etc. It is also known practice to use an electronic key, in particular to unlock the doors of the vehicle or start the engine.

In order to test this equipment, in particular during the vehicle production phase, it is known practice to implement different scenarios depending on the equipment to be tested. These tests are carried out using a computer that sends the identifier of the scenario to be implemented to the computer unit concerned, the scenarios being stored in a memory area of the computer unit.

By way of example, when it is necessary to test the unlocking of the doors, the computer unit in charge of this unlocking, depending on the chosen scenario, controls a certain number of antennas of the vehicle so that they transmit signals. These signals are received by the electronic key, which measures the power of said signals and sends the power values of the signals received from each antenna to the computer unit in a single response message. The computer unit then extracts the received power values from the response message and inserts them into one or more data frames that it makes available on a communication network of the vehicle, for example of CAN (Control Area Network) bus type well known to those skilled in the art, to which the test computer is also connected in order to retrieve said power values and to verify that the antennas and equipment used are functioning correctly.

In order to allow the computer unit to know how many power values are stored in the message received from the electronic key, the computer unit accesses a table stored in a memory area that allows it, on the basis of the identifier of the scenario, to deduce the number of values expected in the response message and to find out how many data frames need to be used to send the power values over the communication network of the vehicle in order to communicate them to the test computer.

The table used therefore lists, for each scenario identifier, the number of power values expected in the response message sent by the electronic key and the number of data frames to be used to send the power values to the test computer via the communication network of the vehicle.

Storing all of these data in the table stored in the computer unit uses a significant portion of the memory area of said computer unit. This presents a significant drawback insofar as the motor vehicle onboard computer units have limited capacities and resources.

SUMMARY OF THE INVENTION

There is therefore a need for a simple and effective solution making it possible to overcome at least some of these drawbacks and, in particular, to reduce the costs and the complexity of the architecture of a vehicle.

To this end, an aspect of the invention firstly relates to a method for testing at least one transmitting antenna of a vehicle, in particular a motor vehicle, using an electronic key and a test computer, said vehicle comprising:
a plurality of transmitting antennas,
a computer unit capable of controlling the transmission of signals by said transmitting antennas,
a communication network capable of being connected to said test computer,
the electronic key being capable of receiving signals sent by said transmitting antennas and of transmitting a signal comprising a response message to said computer unit, said method comprising the steps of:
reception by the computer unit, via the communication network, of a scenario identifier to be implemented in order to test at least one of the transmitting antennas and of a vehicle transmitting antenna configuration identifier, which identifiers are sent by the test computer,
selection, on the basis of said scenario identifier, of an index stored in a first table recorded in a memory area of the computer unit,
selection, on the basis of said selected index, from a second table recorded in the memory area of the computer unit, of a number of power values stored in a response message sent by the electronic key and of a number of data frames to be used to send said received power values to the test computer via the communication network,
control, by the computer unit, of the transmission of at least one signal by said at least one transmitting antenna on the basis of the identifier of the scenario received,
transmission of said at least one signal by said at least one controlled transmitting antenna,
reception of the at least one transmitted signal by the electronic key,
measurement of the power value of the at least one received signal by the electronic key,
sending of the at least one measured power value to the computer unit by the electronic key in a response message,
reception of the response message by the computer unit,
extraction of the at least one power value contained in the received response message on the basis of the number of power values that is selected from the second table,
sending, to the test computer, via the communication network, of the at least one extracted power value in as many data frames as the number of data frames that is selected from the second table.

The use of two tables, one of which comprises indexes each pointing to a pair of values, makes it possible to significantly limit the number of data and therefore the space required in the memory area for performing the tests, which is particularly advantageous for a motor vehicle onboard computer unit.

Advantageously, the first table comprises a single index value for each pair of scenario identifier and vehicle transmitting antenna configuration identifier values.

According to one aspect of the invention, the second table comprises a single value for each pair of index values and number of power values stored in a response message sent by the electronic key.

Advantageously, the second table comprises a single value for each pair of index values and number of data frames to be used to send said received power values to the test computer via the communication network.

An aspect of the invention is also concerned with a computing unit for a vehicle, in particular a motor vehicle, said vehicle comprising a plurality of transmitting antennas capable of being controlled in order to transmit signals and a communication network capable of being connected to a test computer, said computer unit being capable of communicating with an electronic key, said electronic key being capable of receiving signals sent by said transmitting antennas and of transmitting a signal comprising a response message to said computer unit, said computer unit comprising a memory area in which are recorded a first table, in which scenario identifiers and indexes are associated, and a second table, in which each of said indexes is associated with a pair of values comprising a number of power values stored in a response message sent by the electronic key and a number of data frames to be used to send said received power values to the test computer via the communication network, the computer unit being configured to:

receive, via the communication network, a scenario identifier to be implemented in order to test at least one of the transmitting antennas and a vehicle transmitting antenna configuration identifier, which identifiers are sent by the test computer, select from the first table the index corresponding to said identifier, select from the second table the pair of values that is associated with the selected index, control the transmission of at least one signal by said at least one transmitting antenna on the basis of the identifier of the scenario received, receive a response message, sent by the electronic key, comprising at least one power value of the at least one signal transmitted by the at least one transmitting antenna, extract the at least one power value contained in the received response message on the basis of the number of power values that is selected from the second table, send, to the test computer, via the communication network, the at least one extracted power value in as many data frames as the number of data frames that is selected from the second table.

Advantageously, the first table comprises a single index value for each pair of scenario identifier and vehicle transmitting antenna configuration identifier values.

According to one aspect of the invention, the second table comprises a single value for each pair of index values and number of power values stored in a response message sent by the electronic key.

Advantageously, the second table comprises a single value for each pair of index values and number of data frames to be used to send said received power values to the test computer via the communication network.

An aspect of the invention is also concerned with a vehicle, in particular a motor vehicle, comprising a plurality of transmitting antennas, a computer, as presented above, and a communication network capable of being connected to a test computer.

An aspect of the invention is finally concerned with a test system comprising a vehicle as presented above, an electronic key capable of receiving signals sent by the transmitting antennas of said vehicle and of transmitting a signal comprising a response message to the vehicle computer unit, and a test computer capable of being connected to the communication network of the vehicle in order to interchange data frames with the computer unit.

BRIEF DESCRIPTION OF THE DRAWINGS

Further features and advantages of aspects of the invention will become apparent from the description that follows, which is provided with reference to the appended figures, which are provided as non-limiting examples and in which identical references are given to similar objects.

DETAILED DESCRIPTION OF THE PREFERRED EMBODIMENTS

Figure 1:
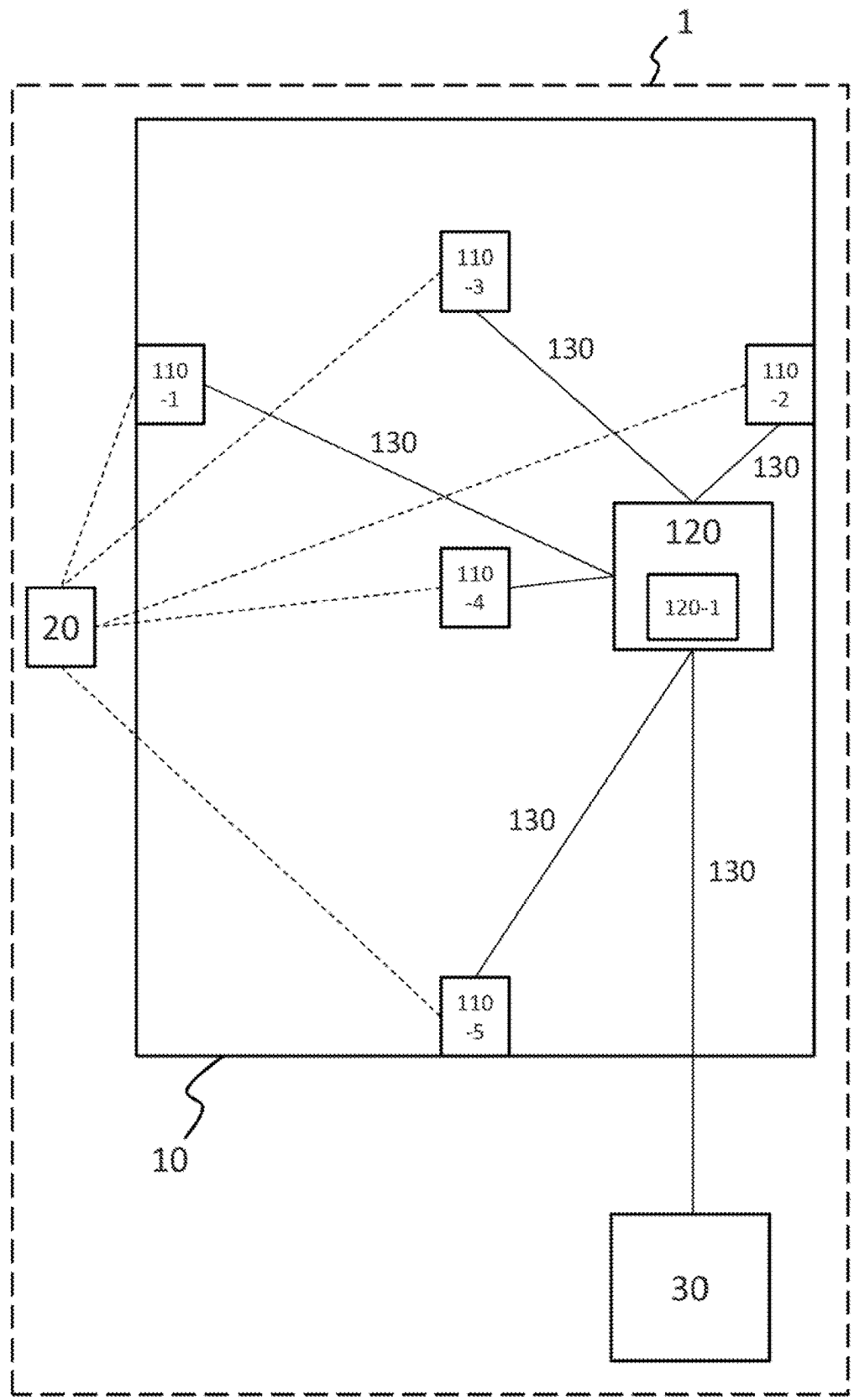
FIG. 1 schematically shows one embodiment of the system according to the invention.

FIG. 1 has been used to schematically show one embodiment of the system 1 according to the invention. In this example, the system 1 comprises a vehicle 10, in particular a motor vehicle, an electronic key 20 and a test computer 30.

The vehicle 10 comprises a plurality of transmitting antennas 110, a computer unit 120 and a communication network 130.

The electronic key 20 is capable of receiving signals sent by the transmitting antennas 110 of the plurality of transmitting antennas 110, for example over a wireless communication link of RF, LF, Wifi or Bluetooth® type.

The electronic key 20 is capable of measuring the power of the signals received from each transmitting antenna 110 of the plurality of transmitting antennas 110 and of transmitting a signal comprising a response message to said computer unit 120, said response message comprising the one or more measured power values.

The communication network 130 on board the vehicle 10 makes it possible to interchange data between the equipment of the vehicle 10 and the outside of the vehicle 10, in particular with the test computer 30 connected to said communication network 130. The communication network 130 may be of CAN (Controller Area Network) bus type, known per se.

The computer unit 120 is configured to control the transmitting antennas 110 so that said transmitting antennas 110 transmit signals. The transmitting antennas 110 can be controlled in turn or simultaneously according to predetermined scenarios stored in a memory area 120-1 of the computer unit 120, each scenario being identified using an identifier.

The computer unit 120 includes a first table and a second table in its memory area 120-1. The first table associates the identifier of each scenario with a predefined index as a function of a given configuration of transmitting antennas 110. The second table associates each index with a pair of values comprising:

a number of power values stored in a response message sent by the electronic key, and a number of data frames to be used to send said received power values to the test computer via the communication network.

The computer unit 120 is configured to receive, via the communication network 130, a scenario identifier and a transmitting antenna 110 configuration identifier, which are sent by the test computer 30. The scenario identifier enables the computer unit 120 to determine the nature of the scenario to be implemented in order to test a particular configuration of transmitting antennas 110.

The computer unit 120 is configured to select from the first table the index corresponding to the scenario identifier and to the transmitting antenna 110 configuration identifier that are received and from the second table the pair of values that is associated with the index selected from the first table.

An example of a first table and an example of a second table have been shown below:

TABLE 1 example of a first table

| Scenario identifier | Configuration | | | |
|---|---|---|---|---|
| | 1 | 2 | 3 | 4 |
| 0 | 0 | 0 | 1 | 2 |
| 1 | 1 | 2 | 2 | 2 |
| 2 | 2 | 3 | 2 | 4 |
| 3 | 5 | 6 | 7 | 7 |
| 4 | 8 | 9 | 9 | 10 |
| 5 | 3 | 4 | 4 | 4 |
| 6 | 2 | 3 | 2 | 4 |
| 7 | 5 | 6 | 7 | 7 |
| 8 | 9 | 8 | 9 | 10 |
| 9 | 8 | 9 | 10 | 10 |

TABLE 2 example of a second table

| Index | NVP | NT |
|---|---|---|
| 0 | 1 | 0 |
| 1 | 1 | 1 |
| 2 | 2 | 0 |
| 3 | 2 | 1 |
| 4 | 2 | 2 |
| 5 | 3 | 0 |
| 6 | 3 | 1 |
| 7 | 3 | 3 |
| 8 | 4 | 0 |
| 9 | 4 | 1 |
| 10 | 4 | 4 |

The same index, having a pointer role, can thus be used for different pairs of scenario identifier and transmitting antenna 110 configuration identifier values, which avoids having to duplicate these pairs of values in the first table and thus makes it possible to optimize the size of said first table and therefore the memory area 120-1 of the computer unit 120.

The second table comprises pairs of number of expected power values and number of data frames to be used that are unique and each correspond to one and only one index. The second table can thus be easily updated with a new pair of expected power values and number of data frames to be used by adding a row with a new index and said new values, which allows easy maintenance of the computer unit 120 and therefore of the vehicle 10.

The computer unit 120 is configured to control the transmission of at least one signal by said at least one transmitting antenna 110 on the basis of the identifier of the scenario received.

The computer unit 120 is configured to receive a response message, sent by the electronic key 20, comprising at least one power value of the at least one signal transmitted by at least one of the transmitting antennas 110.

The computer unit 120 is configured to extract the at least one power value contained in the received response message on the basis of the number of power values that is selected from the second table.

The computer unit 120 is configured to send, to the test computer 30, via the communication network 130, the at least one extracted power value in as many data frames as the number of data frames that is selected from the second table.

Figure 2:
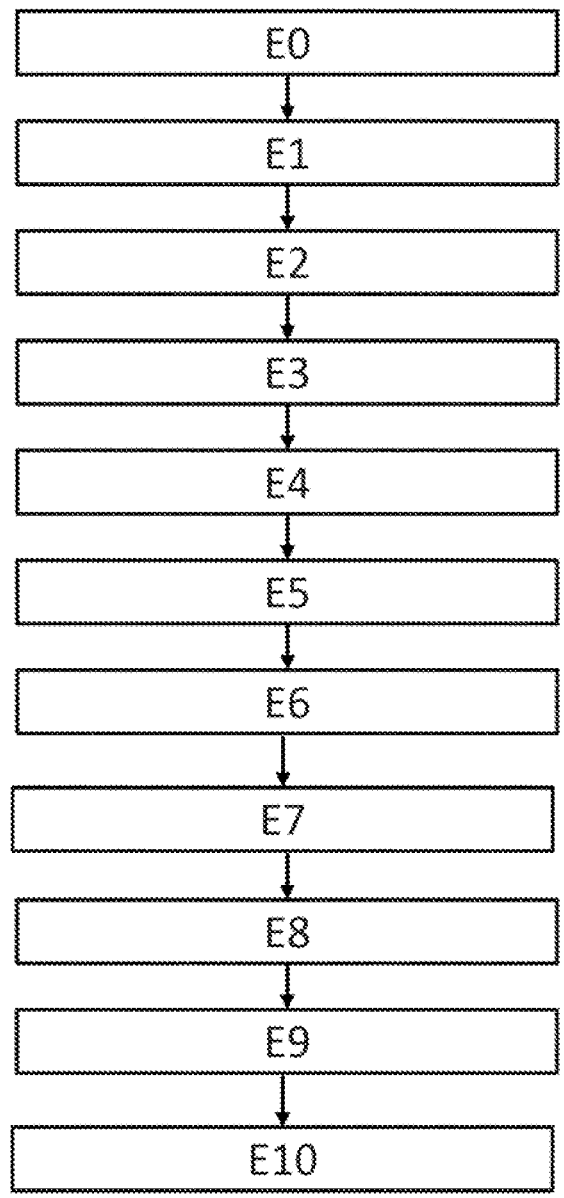
FIG. 2 illustrates an embodiment of the method according to the invention.

An aspect of the invention will now be described in its implementation with reference to FIG. 2.

For example, the vehicle 10 has a configuration of transmitting antennas 110 to be tested that comprises, as illustrated in the example in FIG. 1, a transmitting antenna referenced 110-1 in the driver's door handle, a transmitting antenna referenced 110-2 in the front passenger's door handle, a transmitting antenna referenced 110-3 mounted at the level of the central part of the dashboard of the vehicle 10, a transmitting antenna referenced 110-4 mounted substantially in the center of the vehicle 10 and a transmitting antenna referenced 110-5 mounted at the level of the trunk of the vehicle 10. For example, configuration no. 2 described in table 1 above can correspond to the transmission of each of these transmitting antennas 110 in the following order: transmitting antenna referenced 110-1 in the driver's door handle, transmitting antenna referenced 110-2 in the front passenger's door handle, transmitting antenna referenced 110-3 mounted at the level of the central part of the dashboard, transmitting antenna referenced 110-4 mounted substantially in the center of the vehicle 10 and transmitting antenna referenced 110-5 mounted at the level of the trunk of the vehicle 10.

A scenario to be tested may consist in having each of the five transmitting antennas 110-1, 110-2, 110-3, 110-4, 110-5 transmit in turn in a precise order.

The scenario is stored in the memory area 120-1 so that the computer 120 knows the order of transmission of the transmitting antennas 110-1, 110-2, 110-3, 110-4, 110-5 to be controlled.

The scenario can first be selected by an operator on the test computer 30 connected to the communication network 130. The identifier of the selected scenario and the identifier of the configuration of transmitting antennas 110 to be tested are sent in a step E0 to the computer unit 120 by the test computer 30, via the communication network 130. The operator can for example select scenario no. 3 and configuration no. 2 from table 1 described above.

Once the identifier of the scenario and the identifier of the transmitting antenna 110 configuration have been received by the computer unit 120, in a step E1, the computer unit 120 selects, in a step E2, from the first table, the index corresponding to the received scenario identifier and to the received transmitting antenna 110 configuration identifier. Scenario no. 3 and configuration no. 2 correspond for example to index no. 6 in table 1.

The computer unit 120 then selects, in a step E3, from the second table, the pair of values corresponding to the index selected from the first table. Index no. 6 corresponds to the pair of values (3, 1) in table 2 described above.

The computer unit 120 then controls, in a step E4, the transmission of a signal by each of the transmitting antennas 110 as a function of the scenario received, for example for scenario no. 3 the transmitting antenna referenced 110-1 mounted in the driver's door handle transmits first, then the transmitting antenna referenced 110-2 mounted in the front passenger's door handle, then the transmitting antenna referenced 110-3 mounted at the level of the central part of the dashboard, then the transmitting antenna referenced 110-4 mounted substantially in the center of the vehicle 10 and finally the transmitting antenna referenced 110-5 mounted at the level of the trunk of the vehicle 10.

When the transmitting antennas 110 transmit the signals, the electronic key 20, which as a prerequisite is located in the signal coverage of said transmitting antennas 110, receives them in turn, measuring the power in a step E5, for example the RSSI (Received Signal Strength Indication) value known per se, then sends the measured power values to the computer unit 120 in what is known as a "response" message, for example on a radiofrequency (RF) communication interface, in a step E6.

On reception of said response message by the computer unit 120 (step E7), the computer unit 120 extracts, in a step E8, each power value contained in the response message received by using the number of power values that is selected from the second table, for example 3 in the case of index 6 in table 2.

The computer unit 120 then sends to the test computer 30, in a step E9, via the communication network 130, the extracted power value(s) (the three power values in the case of index 6 in table 2) in as many data frames as the number of data frames that is selected from the second table, for example a single frame in the case of index 6 in table 2.

The test computer 30 or the operator who uses the test computer can then evaluate in a step E10, on the basis of the power values received, whether or not the equipment, in particular the transmitting antennas 110, used in the scenario is functioning correctly.

In this example of tables 1 and 2, 62 payload data values are used (40 boxes in table 1 and 22 boxes in table 2), whereas a corresponding prior art table, for which each pair of scenario and configuration identifiers is associated with a pair of number of power values stored in a response message sent by electronic key 20 and number of data frames to be used to send said received power values to the test computer 30 via the communication network 130, used 80 values, i.e. a gain of 22.5%.

Likewise, in a new type of vehicle with 20 scenarios and 6 configurations, the method according to an aspect of the invention makes it possible to move from 120 stored values to 90 stored values, i.e. a gain of 25%. It is thus noted that the gain increases with the size of the table, which is advantageous insofar as the number of devices and therefore the number of scenarios to be tested and the number of configurations are at risk of increasing in the future.

An aspect of the invention therefore makes it possible, for the same scenarios and the same configurations to be tested, to significantly reduce the size of the memory areas used to store the values used during the tests on the scenarios by configuration, which is particularly advantageous for onboard computer units in motor vehicles.

The invention claimed is:

1. A method for testing at least one transmitting antenna of a vehicle, in particular a motor vehicle, using an electronic key and a test computer, said vehicle comprising:
   a plurality of transmitting antennas;
   a computer unit capable of controlling the transmission of signals by said transmitting antennas;
   a communication network capable of being connected to said test computer;
the electronic key being capable of receiving signals sent by said transmitting antennas and of transmitting a signal comprising a response message to said computer unit, said method comprising:

reception by the computer unit, via the communication network, of a scenario identifier to be implemented in order to test at least one of the transmitting antennas and of a vehicle transmitting antenna configuration identifier, which identifiers are sent by the test computer;

selection, on the basis of said scenario identifier, of an index stored in a first table recorded in a memory area of the computer unit;

selection, on the basis of said selected index, from a second table recorded in the memory area of the computer unit, of a number of power values stored in a response message sent by the electronic key and of a number of data frames to be used to send said received power values to the test computer via the communication network;

control, by the computer unit, of the transmission of at least one signal by said at least one transmitting antenna on the basis of the identifier of the scenario received;

transmission of said at least one signal by said at least one controlled transmitting antenna;

reception of the at least one transmitted signal by the electronic key;

measurement of the power value of the at least one received signal by the electronic key;

sending of the at least one measured power value to the computer unit by the electronic key in a message;

reception of the response message by the computer unit;

extraction of the at least one power value contained in the received response message on the basis of the number of power values that is selected from the second table; and sending, to the test computer, via the communication network, of the at least one extracted power value in as many data frames as the number of data frames that is selected from the second table.

2. The method as claimed in claim 1, wherein the first table comprises a single index value for each pair of scenario identifier and vehicle transmitting antenna configuration identifier values.

3. The method as claimed in claim 1, wherein the second table comprises a single value for each pair of index values and number of power values stored in a response message sent by the electronic key.

4. The method as claimed in claim 1, wherein the second table comprises a single value for each pair of index values and number of data frames to be used to send said received power values to the test computer via the communication network.

5. A computer unit for a vehicle, said vehicle comprising:
   a plurality of transmitting antennas capable of being controlled in order to transmit signals;
   a communication network capable of being connected to a test computer;
said computer unit being capable of communicating with an electronic key, said electronic key being capable of receiving signals sent by said transmitting antennas and of transmitting a signal comprising a response message to said computer unit, said computer unit comprising a memory area in which are recorded a first table, in which scenario identifiers and indexes are associated, and a second table, in which each of said indexes is associated with a pair of values comprising a number of power values stored in a response message sent by the electronic key and a number of data frames to be used to send said received power values to the test computer via the communication network, the computer unit being configured to:
- receive, via the communication network, a scenario identifier to be implemented in order to test at least one of the transmitting antennas and a vehicle transmitting antenna configuration identifier, which identifiers are sent by the test computer;
- select from the first table the index corresponding to said identifier;
- select from the second table the pair of values that is associated with the selected index;
- control the transmission of at least one signal by said at least one transmitting antenna on the basis of the identifier of the scenario received;
- receive a response message, sent by the electronic key, comprising at least one power value of the at least one signal transmitted by the at least one transmitting antenna;
- extract the at least one power value contained in the received response message on the basis of the number of power values that is selected from the second table, and
- send, to the test computer, via the communication network, the at least one extracted power value in as many data frames as the number of data frames that is selected from the second table.

6. The computer unit as claimed in claim 1, wherein the first table comprises a single index value for each pair of scenario identifier and vehicle transmitting antenna configuration identifier values.

7. The computer unit as claimed in claim 5, wherein the second table comprises a single value for each pair of index values and number of power values stored in a response message sent by the electronic key.

8. The computer unit as claimed in claim 5, wherein the second table comprises a single value for each pair of index values and number of data frames to be used to send said received power values to the test computer via the communication network.

9. A vehicle, comprising:
- a plurality of transmitting antennas;
- a computer unit comprising a memory area in which are recorded a first table, in which scenario identifiers and indexes are associated, and a second table, in which each of said indexes is associated with a pair of values comprising a number of power values stored in a response message sent by an electronic key and a number of data frames to be used to send said received power values to the test computer via the communication network; and
- a communication network capable of being connected to a test computer,
- wherein said computer unit communicates with the electronic key, said electronic key being capable of receiving signals sent by said transmitting antennas and transmitting a signal comprising a response message to said computer unit.

10. A test system for use with a test computer comprising:
- a vehicle comprising:
  - a plurality of transmitting antennas;
  - a computer unit; and
  - a communication network capable of being connected to the test computer; and
- an electronic key capable of receiving signals sent by the plurality of transmitting antennas of said vehicle and of transmitting a signal comprising a response message to the computer unit of the vehicle,
- wherein the computer unit is capable of communicating with the electronic key, the computer comprising a memory area in which are recorded a first table, in which scenario identifiers and indexes are associated, and a second table, in which each of said indexes is associated with a pair of values comprising a number of power values stored in a response message sent by the electronic key and a number of data frames to be used to send said received power values to the test computer via the communication network; and
- wherein the test computer is capable of being connected to a communication network of the vehicle in order to interchange data frames with the computer unit.

* * * * *